July 1, 1930. C. H. FOSTER 1,769,425
SHOCK ABSORBER
Filed June 16, 1928 2 Sheets-Sheet 2
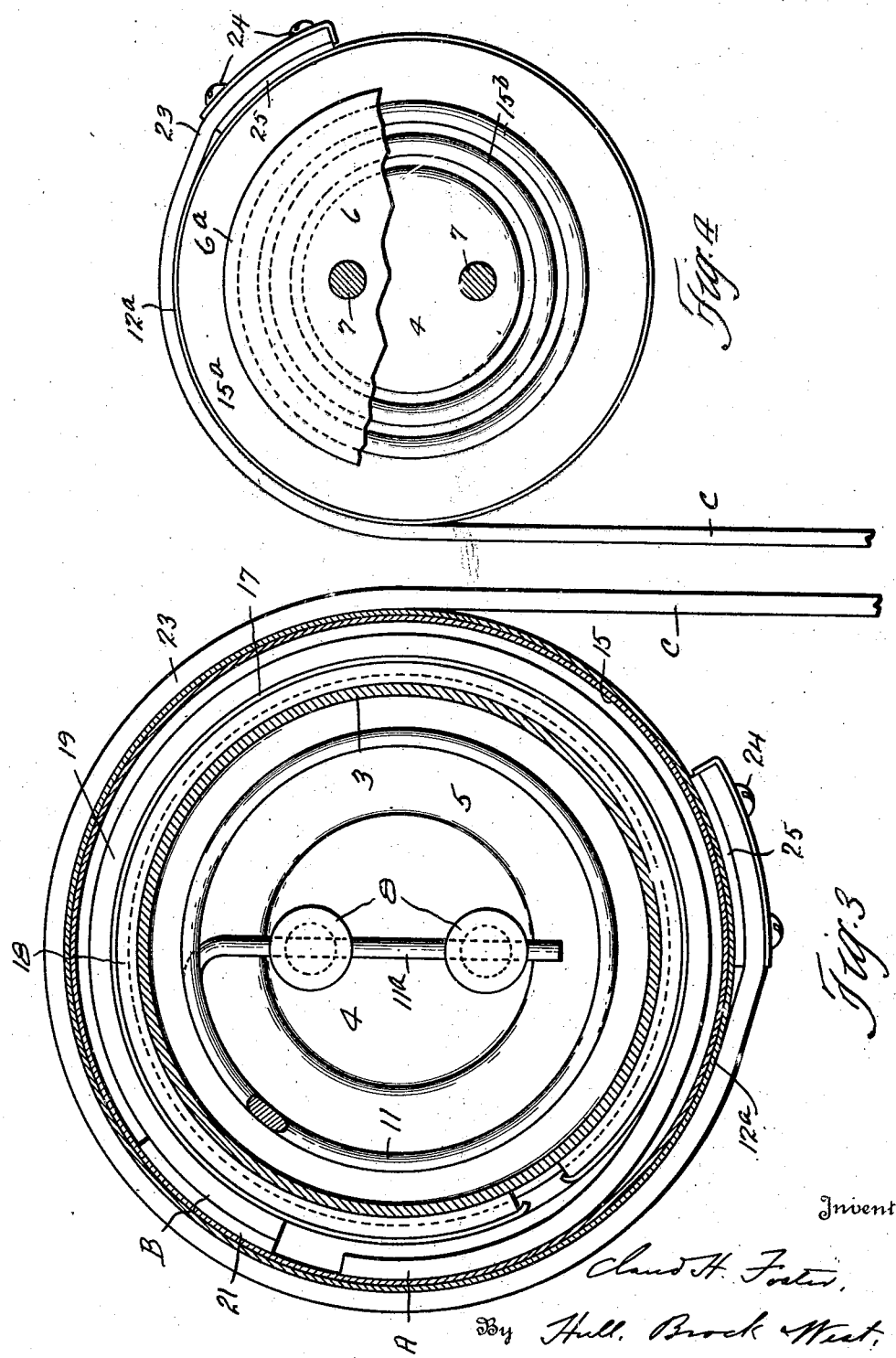

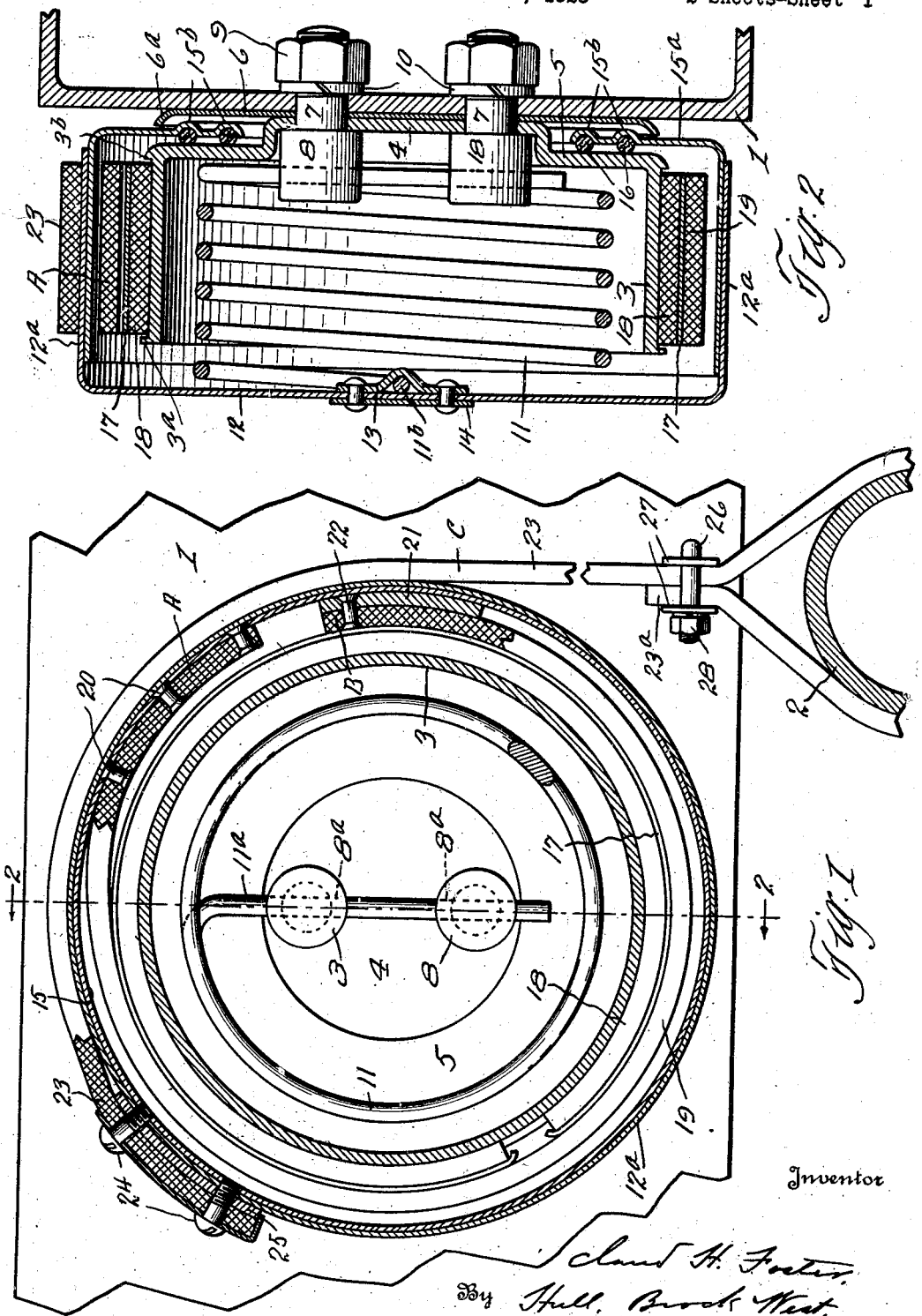

Patented July 1, 1930

1,769,425

UNITED STATES PATENT OFFICE

CLAUD H. FOSTER, OF WICKLIFFE, OHIO

SHOCK ABSORBER

Application filed June 16, 1928. Serial No. 285,911.

This invention relates to shock absorbers such as are interposed between the axles and bodies of automobiles for the purpose of checking relative movements therebetween due to the encountering of obstacles or depressions by the wheels.

It is the general purpose and object of the invention to provide a shock absorber which is not only simple of construction and economical of production, but which will automatically effect the gripping or braking action of the brake band upon the drum by the separation of the body and axle and which also will automatically effect the release of such gripping or braking action under conditions to be pointed out hereinafter.

A further object of the invention is to provide a shock absorber of this type which is capable of withstanding and accommodating all ordinary incidents of use.

The shock absorber as specifically illustrated and described herein consists generally of a brake drum, with a pair of concentric brake bands arranged externally of the drum, and a strap operatively connected to the outer of said bands for effecting certain braking actions of the bands upon the drum as well as a braking action of the outer of said bands upon the inner band, there being a helical spring operatively connected with the strap and with the outer band for taking in the slack of the strap as the vehicle members approach each other and for simultaneously moving the outer brake band to a position where it is adapted, upon separation of the vehicle members, to engage the inner band.

Referring to the drawings, Fig. 1 represents a sectional elevation of a shock absorber constructed in accordance with my invention, showing the parts in the positions which they occupy when the vehicle springs are under normal riding conditions; Fig. 2 a sectional view corresponding to the line 2—2 of Fig. 1; Fig. 3 a view similar to Fig. 1, showing the parts of the shock absorber in the positions which they occupy when the vehicle body and axle have approached each other following a somewhat severe compression of the vehicle springs and Fig. 4 a rear elevation of the said shock absorber, with certain parts broken away.

Describing the various parts by reference characters 1 denotes one of the side frame members and 2 the axle housing of a vehicle. 3 denotes a cylindrical brake drum having a bottom or back wall, the central portion 4 of which is offset from the peripheral portion 5, such offset portion being seated within a metal disk 6 having a rounded peripheral flange $6^a$. The brake drum is secured to the side frame member 1 by means of bolts, the shanks of which are indicated at 7 and which shanks project through openings in the parts 1, 4 and 6. Each bolt is provided with an enlarged cylindrical head 8 within the body of the brake drum, the opposite ends of the bolts being threaded and provided with nuts 9 and lock washers 10.

The bolt heads 8 are provided each with a transverse bore $8^a$ adapted to receive the inner end $11^a$ of a helical spring 11, thereby to anchor the spring within the drum. The outer end $11^b$ of the said spring is secured to the inner or rear face of the flat front or outer plate 12 of the outer cover member of a housing, which cover member comprises the said plate and a cylindrical wall $12^a$. The end $11^b$ may be secured to the plate 12 in any convenient manner, as by means of one or more inner clamping members 13 having each a V-shaped groove at its center adapted to engage the said end of the spring, the clamping members being riveted through the plate 12 to a plate 14 on the front of the plate 12, which plate 14 may be a name plate.

The wall $12^a$ telescopes over a cylindrical wall 15 of the rear or inner housing member, and the latter wall merges with a rear annular wall $15^a$ having its inner edge spaced from the central portion 4 of the base of the brake drum. The rear annular wall $15^a$ is provided with a pair of rearwardly or inwardly extending annular grooves $15^b$ therein, each of which is adapted to receive a packing ring 16, which packing rings engage the portion 5 of the rear or inner wall of the brake drum, thereby to prevent the entrance of dust into the interior of the housing which encloses the brake drum and the brake band.

The entrance of dust is further prevented by means of the flanged disk 6, 6ª.

The housing constituted by the parts 12, 12ª and 15, 15ª is spaced from the brake drum and is movable with reference thereto, for a purpose to be explained hereinafter.

17 denotes a spring metal band having therewithin and attached thereto a friction band 18, the said band being of any suitable material, such as fabric belting. The spring band 17 is given a curvature such that it tends to hold the band 18 in close engagement with the outer surface of the drum 3. The composite band is of such length that, when applied to the drum its ends preferably will be in close proximity to each other. The drum 3 is provided with a circumferential flange or shoulder 3ª at its outer end and with a similar flange or shoulder 3ᵇ at its inner end, which flanges or shoulders retain the composite band 17, 18 upon the drum.

Surrounding the band 17, 18 within the housing is an outer brake band 19 preferably of fabric belting and having its ends in proximity to each other. This band is of considerably less thickness than the width of the space between the interior of the housing and the band 17. One end A of the band 19 is secured to the housing as by means of rivets 20 extending through such end and secured to the inner wall 15 of the housing. This end of the band 19 will be held out of contact with the band 17 by virtue of the fact that the space between the band 17 and the inner wall of the housing is considerably greater than the thickness of the band 19.

The opposite end B of the band 19 is built up by means of a filler strip 21 to a thickness equal to the width of the space between the inner wall of the housing and the band 17, the filler strip being secured to the band 19 by one or more rivets 22.

For the purpose of causing the brake bands 17, 18 and 19 to function through the separation of the body and axle, I secure to the housing the upper end portion 23 of a strap C. This strap also may be made of fabric belting and has its upper end secured to both walls 12ª and 15 of the housing by means of short screw bolts 24 extending through the strap C, through a metal plate 25 on the inner surface of the strap end, and through the walls of the housing. The lower portion of the strap is looped around the axle housing 2; and the extreme end 23ª of such end portion is fastened to the body of the strap by means of U-bolts 26, plates 27, and nuts 28 on the ends of the legs of the bolt.

In Figs. 1 and 2 the parts A and B are shown in the positions which they occupy during ordinary or normal riding conditions. Owing to the fact that the housing floats with reference to the brake drum, some light pressure will be exerted through the strap C and through the built up end B of the brake band upon the drum. The opposite end A of the strap will be free from the composite band 17, 18 and will be exerting no pressure thereupon and no pressure against the drum. It will be noted that, when the parts are in the position shown in Fig. 1, the housing can be rotated in a clockwise direction only a very short distance before the built-up end B of the strap 19 will have passed below a point at which the housing will thrust such end against the band 17, 18 through the action of the strap C. The purpose of this arrangement will be explained hereinafter.

With the parts constructed and arranged as described, when the wheels encounter an obstacle which moves the axle toward the body, the spring 11 will move the brake band freely in a counter-clockwise direction around the brake drum, taking in the slack of the strap C. No matter how rapid may be the movement of the axle toward the body, or vice versa, the spring 11 is under sufficient torsion to enable it immediately to rotate the housing and thereby take in the slack of the strap and fleet the band 19 about the band 17 which, being of material having a low coefficient of friction, such as brass, will not oppose any material resistance to such movement of the band 19. At the end of the movement of the body and axle toward each other, the positions of the parts of the shock absorber will be approximately as shown in Fig. 3, depending upon the extent of movement of the body and axle toward each other. On recoil or separation of the body and axle, the strap C, due to the floating of the housing to which it is connected as well as to the somewhat yielding nature of the housing, will press the built-up end B of the strap 19 against the part of the composite brake band therewithin while pulling on the opposite end of the strap 19 against such pressure. The more severe or rapid the recoil, the more quickly and strongly will the built-up end of the brake band be pressed against the outer surface of the brake band therewithin, with a corresponding pressure of the latter band against the brake drum. According to the severity or rapidity of the reaction, the following actions will occur:—

(a) Under light reaction, following a movement of small amplitude of the body and axle toward each other, the band 19 will slide upon the outer band 17 of the composite brake band therein, exercising a slight braking action upon the drum with no necessary rotation of the inner brake band.

(b) Under a more severe reaction, following a greater movement of the body and axle toward each other, the band 19 will slide upon the band 17, 18 and the latter will also slide upon the drum 3. That is to say, the inner band will slide upon the brake drum and the outer band will slide upon the inner band.

(c) Under a still more severe reaction, following a correspondingly increased movement of the body toward the axle, the band 19 will be gripped so strongly upon the band 17, 18, that there will be no relative movement between the inner and outer bands, both bands moving in unison and producing a maximum braking action.

However, on the hardest or most severe reaction of the vehicle springs after impact, the inner brake band can slide upon the drum, thereby preventing the locking of the brake bands to the drum and preventing the shearing of the attaching bolts 7, or the breaking of the strap C, or the shearing of the bolts or rivets by which the strap is attached to the housing and axle.

It is desirable that the braking action shall not continue throughout the entire range of rebound movement or reaction, as this would interfere with ease of riding and with the desirable action of the vehicle spring. Therefore, as the built-up end B of the outer brake band approaches the position shown in Fig. 1, the pressure of such end upon the inner band and hence of the latter band upon the drum, is relaxed and, when the built-up end shall have passed below the point of tangency of the strap C to the housing and the pressure of the same against the inner brake band by the strap C shall have been relaxed, further separation will be resisted only by the vehicle springs and by the comparatively slight resistance afforded by the spring 11.

Furthermore, because of the fact that the housing is movable or floats with reference to the brake drum and because of the fact that the metal of which it is composed is resilient, the end B of the brake band will always be in effective engagement with the inner brake band and the housing when the body and axle are moving away from each other—up to the time when the end B shall have passed below the place at which it is subjected to the pressure of the strap C.

The spring 11 is normally under light compression, as well as under torsion whereby it presses the packing 16 against the back of the brake drum, thereby compensating for wear and preventing entrance of dust, etc. into the housing.

It will be noted that clearance is provided between the inner brake band 18 and the flanges $3^a$ and $3^b$. This enables the inner band to move outwardly with the outer band and with the housing and to maintain complete engagement between the outer band and the strip 17 as the housing is moved outwardly by the spring 11, due to the compression or wearing of the packing 16. Unless this clearance is provided, it will be advisable to make the composite band 17, 18 somewhat wider than the band 19 so as to secure full braking contact between the inner surface of the band 19 and the exterior surface of the strip 17 while allowing the band 19 to move outwardly upon the strip 17.

In describing the invention, it has been assumed, for convenience of description, that the brake drum and housing will be carried by one of the side frame members and that the strap C will be secured to the upper portion of the housing and extend around such upper portion, with its lower end secured to the axle housing; and the terms "upper" and "lower" have been used in connection with such description, but without any intention of limiting thereby the use of the invention to such specific location and arrangement of parts.

Furthermore, while I have described the flexible member C as a "strap", I do not intend thereby to limit my invention to the use of any particular material or to any particular shape of material which may be employed for such strap or member.

Having thus described my invention, what I claim is:

1. A shock absorber comprising a brake drum adapted to be secured to one of two relatively movable vehicle members, a housing surrounding the said drum and spaced therefrom and movable with respect thereto, a strap connected at one end to the exterior of said housing and adapted to be connected at its other end to the other vehicle member and adapted to extend about and engage a portion of the outer surface of the housing, a spring having one end anchored with respect to the housing and its other end connected to said housing, a brake band on said drum having an anti-friction outer surface, and a brake band mounted on the first mentioned brake band and having one end secured to said housing and spaced from the first mentioned band, the opposite end of the second brake band substantially filling the space between the first band and the housing.

2. A shock absorber comprising a base adapted to be secured to one of two relatively movable vehicle members, a brake drum carried by said base, a housing surrounding the said drum and spaced therefrom and movable with respect thereto, a strap connected at one end to the exterior of said housing and adapted to be connected at its other end to the other vehicle member and adapted to extend about and engage a portion of the outer surface of the housing, a spring having one end anchored to the base and its other end connected to said housing, a brake band on said drum having an anti-friction outer surface, and a brake band mounted on the first mentioned brake band and having one end secured to said housing and spaced from the first mentioned band, the opposite end of the second brake band being adapted to be pressed against the first-mentioned brake band by the action of the strap on the housing.

3. A shock absorber comprising a brake drum adapted to be secured to one of two relatively movable vehicle members, a housing surrounding the said drum and spaced therefrom and movable with respect thereto, a strap connected at one end to the exterior of said housing and adapted to be connected at its other end to the other vehicle member and adapted to extend about and engage a portion of the outer surface of the housing, a spring having one end anchored with respect to said housing and its other end connected to said housing, a brake band on the said drum, the said band comprising an inner member having a relatively high coefficient of friction and an outer member of spring metal tending to hold the inner member in contact with said drum, and a brake band mounted on the first mentioned brake band and having one end secured to the said housing and spaced from the first mentioned band, the opposite end of the second brake band being adapted to be pressed against the first-mentioned brake band by the action of the strap on the housing.

4. The combination, with two relatively movable vehicle members, of a shock absorber comprising a brake drum secured to one of said members, a brake band surrounding the said drum, a housing surrounding the brake band and brake drum and spaced therefrom and movable toward and from the drum, a brake band interposed between the said housing and the first mentioned brake band, one end of the second brake band being connected to the said housing and being spaced from the first mentioned brake band and the opposite end of the second band being free from the housing but substantially filling the space between the said housing and the first-mentioned brake band, a strap connected at one end to the housing and connected at its other end to the other vehicle member and extending about and engaging a portion of the outer surface of the housing, and a spring connected to said housing and adapted to rotate the same in a direction to take in the slack of the strap as the vehicle members approach each other and to rotate the outer brake band freely about the drum and the inner brake band.

5. The combination, with two relatively movable vehicle members, of a shock absorber comprising a brake drum secured to one of said members, a brake band surrounding the said drum, a housing surrounding the brake band and brake drum and spaced therefrom and movable toward and from the drum, a brake band interposed between the said housing and the first mentioned brake band, one end of the second brake band being connected to the said housing and being spaced from the first mentioned brake band and the opposite end of the second band being free from the housing and arranged to be pressed against the first-mentioned brake band by the action of the strap on the housing, a strap connected at one end to the housing and connected at its other end to the other vehicle member and extending about and engaging a portion of the outer surface of the housing, and means connected to said housing for rotating the same in a direction to take in the slack of the strap as the vehicle members approach each other and to rotate the outer brake band freely about the drum and the inner brake band.

6. The combination, with two relatively movable vehicle members, of a shock absorber comprising a brake drum secured to one of said members, a brake band surrounding the said drum, a housing surrounding the brake band and brake drum and spaced therefrom and movable toward and from the drum, a brake band interposed between the said housing and the first mentioned brake band, one end of the second brake band being connected to the said housing and being spaced from the first mentioned brake band the opposite end of the second band being free from the housing but substantially filling the space between the said housing and the first mentioned brake band, a strap connected at one end to the housing and connected at its other end to the other vehicle member and extending about and engaging a portion of the outer surface of the housing, and a spring connected to said housing and adapted to rotate the same in a direction to take in the slack of the strap as the vehicle members approach each other and to rotate the outer brake band freely about the drum and the inner brake band, the exterior surface of the inner band having a low coefficient of friction and the inner surface of the outer band and the interior surface of the inner band each having a high coefficient of friction.

7. The combination, with two relatively movable vehicle members, of a shock absorber comprising a brake drum secured to one of said members, a brake band surrounding the said drum, a brake band substantially surrounding the first mentioned band, and a flexible connection between the other vehicle member and the second brake band and serving to cause the second band to exert a braking pressure against the first band during movements of a predetermined amplitude of the vehicle members away from each other and to release such pressure when such amplitude shall have been exceeded, and a spring connected with the outer brake band for rotating the same with respect to the drum and for taking in the slack of the flexible connection during movements of the vehicle members toward each other.

8. The combination, with two relatively movable vehicle members, of a shock absorber comprising a brake drum secured to one of the said members, a brake band surrounding said drum, a second brake band substantially surrounding the first mentioned band, and a flexible connection between the other vehicle member and the outer brake band and serving to cause the second brake band to exert a braking pressure against the first mentioned band and thereby against the drum during movements of a predetermined amplitude of the vehicle members away from each other and to release such pressure when such amplitude shall have been exceeded, and a spring connected with the outer brake band for moving the same and for taking in the slack of the said flexible connection during the latter movements of the vehicle members.

9. The combination, with two relatively movable vehicle members, of a shock absorber comprising a brake drum secured to one of the said members, a brake band surrounding said drum, a second brake band substantially surrounding the first mentioned band, and a flexible connection between the other vehicle member and the outer brake band and serving to cause the second brake band to exert a braking pressure against the first mentioned band and thereby against the drum during movements of a predetermined amplitude of the vehicle members away from each other and to release such pressure when such amplitude shall have been exceeded, as well as during the movements of the vehicle members toward each other, and a spring connected with the outer brake band for moving the same and for taking in the slack of the said flexible connection during the latter movements of the vehicle members.

10. The combination, with two relatively movable vehicle members, of a shock absorber comprising a brake drum secured to one of the said members, a brake band surrounding the said drum, a second brake band substantially surrounding the first mentioned band, and a flexible connection between the other vehicle member and the outer brake band and serving to cause the following actions of the brake band, dependent upon the violence of the recoil movements of the vehicle axle and body:—(a) the sliding of the outer brake band upon the inner brake band, the inner brake band being practically immovable upon the drum; (b) the sliding of the outer brake band upon the inner brake band and the sliding of the latter band upon the drum; (c) the sliding of the inner band only upon the drum, the outer band moving in unison therewith, and a spring connected with the outer brake band for rotating the same with respect to the drum and the inner brake band and for taking in the slack of the flexible connection during movements of the vehicle members toward each other.

11. A shock absorber adapted to be interposed between two relatively movable vehicle members, the said shock absorber comprising a brake drum having a base by means of which it may be secured to one of said members, a housing surrounding the brake drum and enclosing the open end thereof and having an annular wall interposed between the outer portion of the base of the said drum and the vehicle member to which the said drum is attached, there being packing interposed between said annular wall and the drum base, a helical spring having one end anchored with respect to the housing and its other end connected to the cover portion of said housing, the said brake drum having circumferential retaining flanges on the cylindrical outer surface thereof, a brake band of less width than the space between said flanges and mounted on the cylindrical surface of the drum between said flanges, a strap secured to the housing and adapted to engage the exterior of the same, and a brake band mounted on the first mentioned brake band and having one end secured to the said housing and spaced from the first mentioned band, the opposite end of the second brake band being adapted to be pressed against the first mentioned brake band by the action of the strap on the housing.

12. A shock absorber adapted to be interposed between two relatively movable vehicle members, the said shock absorber comprising a brake drum having a base by means of which it may be secured to one of said members, a housing surrounding the brake drum and enclosing the open end thereof and having an annular wall interposed between the outer portion of the base of the said drum and the vehicle member to which the said drum is attached, there being packing interposed between said annular wall and the drum base, a helical spring having one end anchored with respect to the housing and its other end connected to the cover portion of said housing, the said brake drum having a circumferential retaining flange on the cylindrical outer surface thereof and adjacent to the outer end of said drum, a brake band, a strap secured to the housing and adapted to engage the exterior of the same, and a brake band mounted on the first mentioned brake band and having one end secured to the said housing and spaced from the first mentioned band, the opposite end of the second brake band being arranged to be pressed against the first mentioned brake band by the action of the strap on the housing.

In testimony whereof, I hereunto affix my signature.

CLAUD H. FOSTER.